US012448765B2

(12) United States Patent
Steele et al.

(10) Patent No.: US 12,448,765 B2
(45) Date of Patent: Oct. 21, 2025

(54) TOILET PLUNGER CADDY WITH CLEANING MECHANISM

(71) Applicants: Elaine Augusta Steele, Arlington, VA (US); Pierre Malko, Arlington, VA (US)

(72) Inventors: Elaine Augusta Steele, Arlington, VA (US); Pierre Malko, Arlington, VA (US)

( * ) Notice: Subject to any disclaimer, the term of this patent is extended or adjusted under 35 U.S.C. 154(b) by 219 days.

(21) Appl. No.: 18/488,160

(22) Filed: Oct. 17, 2023

(65) Prior Publication Data

US 2024/0044120 A1 Feb. 8, 2024

Related U.S. Application Data

(63) Continuation-in-part of application No. 17/301,947, filed on Apr. 20, 2021, now Pat. No. 11,808,021.

(60) Provisional application No. 62/704,117, filed on Apr. 22, 2020.

(51) Int. Cl.
*E03D 9/00* (2006.01)
*B08B 9/00* (2006.01)

(52) U.S. Cl.
CPC . *E03D 9/00* (2013.01); *B08B 9/00* (2013.01)

(58) Field of Classification Search
CPC ...................................................... A47K 11/10
See application file for complete search history.

(56) References Cited

U.S. PATENT DOCUMENTS

| | | | | |
|---|---|---|---|---|
| 1,768,178 | A | 6/1930 | Watson | |
| 2,052,563 | A | 9/1936 | Gould | |
| 2,697,842 | A | 12/1954 | Meyer | |
| 5,958,150 | A | 9/1999 | Borger et al. | |
| 6,383,457 | B1 | 5/2002 | Brown | |
| 6,719,134 | B2 | 4/2004 | Phillips et al. | |
| 7,062,800 | B1 | 6/2006 | Alfred | |
| 7,841,029 | B1 | 11/2010 | Williams | |
| 7,908,681 | B2 | 3/2011 | Nguyen et al. | |
| 8,510,874 | B2 | 8/2013 | Duboc | |
| 9,068,330 | B2 | 6/2015 | Schultz | |
| 9,133,610 | B2 | 9/2015 | Dressel et al. | |
| 9,464,424 | B1 * | 10/2016 | Wiltshire | E03D 9/005 |
| 2005/0028259 | A1 | 2/2005 | Buchanan et al. | |
| 2005/0229296 | A1 | 10/2005 | Lanier | |
| 2006/0123531 | A1 * | 6/2006 | Karlicek | A47K 17/00 4/255.11 |
| 2009/0106887 | A1 | 4/2009 | Dressel | |
| 2010/0132102 | A1 | 6/2010 | Flamand | |
| 2010/0275356 | A1 | 11/2010 | Hovsepian et al. | |
| 2011/0162983 | A1 * | 7/2011 | Weis | A47K 11/10 206/229 |
| 2011/0253180 | A1 | 10/2011 | Davidson | |
| 2016/0258149 | A1 | 9/2016 | Scheuerman | |
| 2018/0118346 | A1 | 5/2018 | Sheehan et al. | |
| 2018/0290178 | A1 * | 10/2018 | Levitt | A47K 17/00 |

(Continued)

*Primary Examiner* — Christine J Skubinna

(74) *Attorney, Agent, or Firm* — Dunlap Bennett & Ludwig, PLLC; Anna L. Kinney

(57) ABSTRACT

A plunger caddy and cleaning assembly includes a housing that accommodates a plunger; a fluid reservoir mounted within the housing; tubing extending from an interior of the fluid reservoir; and a fluid dispersing assembly in connected to the fluid reservoir by way of the tubing. The fluid dispersing assembly has a spray wand with a handle and is removably mounted to the housing.

12 Claims, 8 Drawing Sheets

(56) References Cited

U.S. PATENT DOCUMENTS

| | | | |
|---|---|---|---|
| 2019/0125910 | A1 | 5/2019 | Johnson |
| 2020/0024839 | A1 | 1/2020 | Tapper |

* cited by examiner

FIG. 3
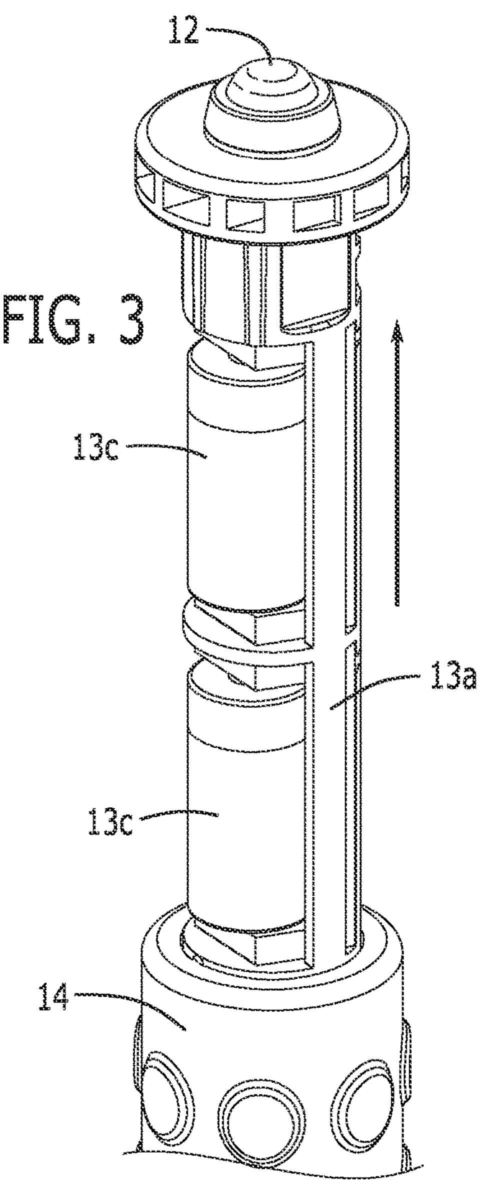
FIG. 4
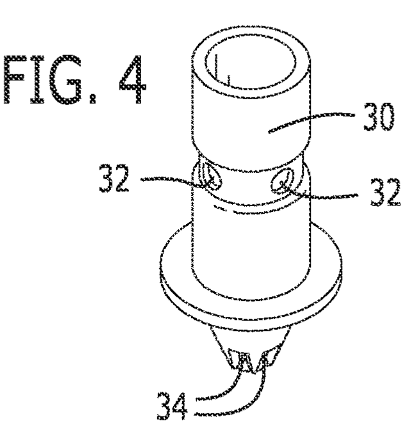
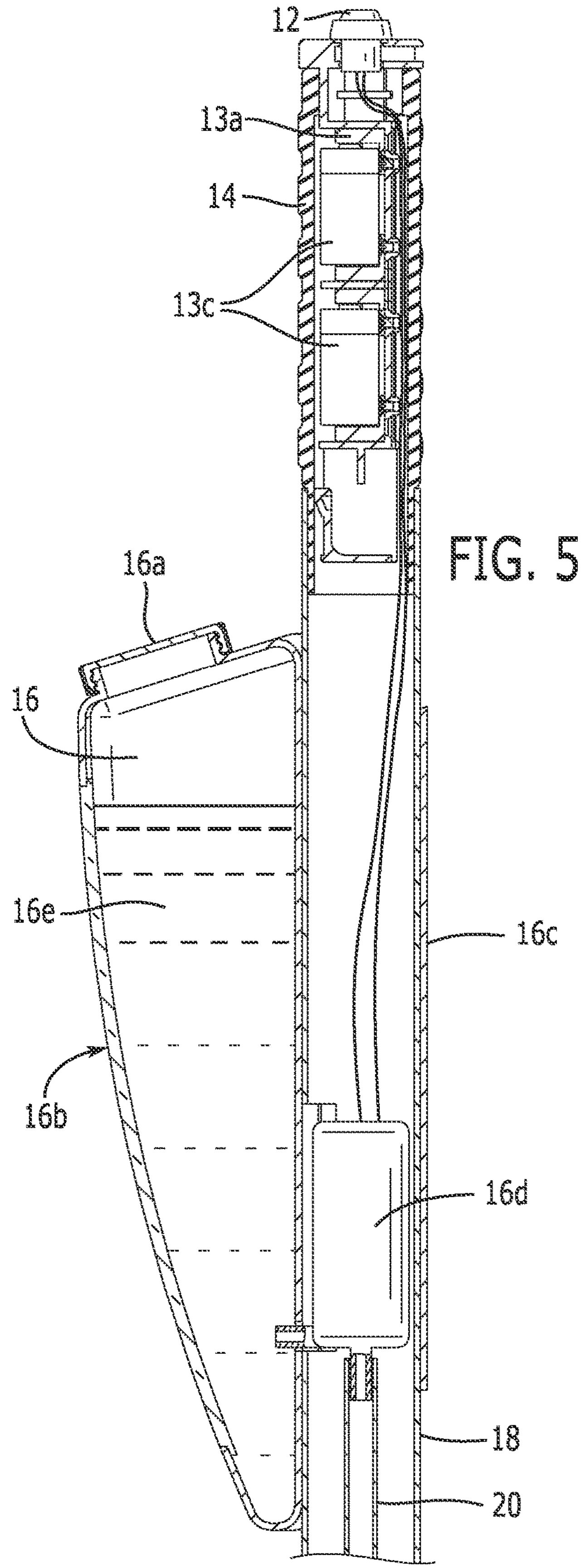
FIG. 5

TOILET PLUNGER CADDY WITH CLEANING MECHANISM

CROSS-REFERENCE TO RELATED APPLICATION

This application is a continuation-in-part of U.S. nonprovisional application Ser. No. 17/301,947, filed Apr. 20, 2021. Application Ser. No. 17/301,947 claims the benefit of priority of U.S. provisional application No. 62/704,117, filed Apr. 22, 2020, the contents of which are herein incorporated by reference.

BACKGROUND OF THE INVENTION

The present invention relates to a toilet plunger and, more particularly, to a toilet plunger with a cleaning mechanism.

After plunging a clogged toilet, the plunger cup is covered in human excrement. The plunger is then typically placed back in its stand or in the tub to be cleaned later. In most cases, the plunger is never cleaned and sits covered in germs and waste. Generally, plungers do not have any built-in cleaning mechanism. Rinsing a plunger in the tub or sink or anything else spreads the germs to those vessels. A user may set it in a container with disinfectant but then the container with dirty disinfectant must be handled, emptied, and cleaned. Other methods of cleaning a plunger require multiple steps which typically lead to delaying the process of cleaning the plunger, avoidance of cleaning the plunger, or cleaning the plunger in a manner that spreads germs. Buying replacement plungers is costly and unnecessary between uses.

As can be seen, there is a need for a cleaning mechanism that allows a plunger to be cleaned after use without spreading germs.

SUMMARY OF THE INVENTION

In one aspect of the present invention, a plunger caddy and cleaning assembly comprises a housing configured to accommodate a plunger; a fluid reservoir mounted within the housing; a tubing extending from an interior of the fluid reservoir; and a fluid dispersing assembly in fluid communication with the fluid reservoir by way of the tubing, the fluid dispersing assembly having a spray wand with a handle, wherein the fluid dispersing assembly is removably mounted to the housing.

These and other features, aspects and advantages of the present invention will become better understood with reference to the following drawings, description, and claims.

BRIEF DESCRIPTION OF THE DRAWINGS

FIG. 3 is a detail perspective view of a battery compartment of the plunger of FIG. 1;

FIG. 4 is a detail perspective view of a bottom sprayer of the plunger, taken at line 4-4 of FIG. 2;

FIG. 5 is a cross-sectional view of the handle portion of the plunger, taken at line 5-5 of FIG. 1;

DETAILED DESCRIPTION OF THE INVENTION

Figure 1:
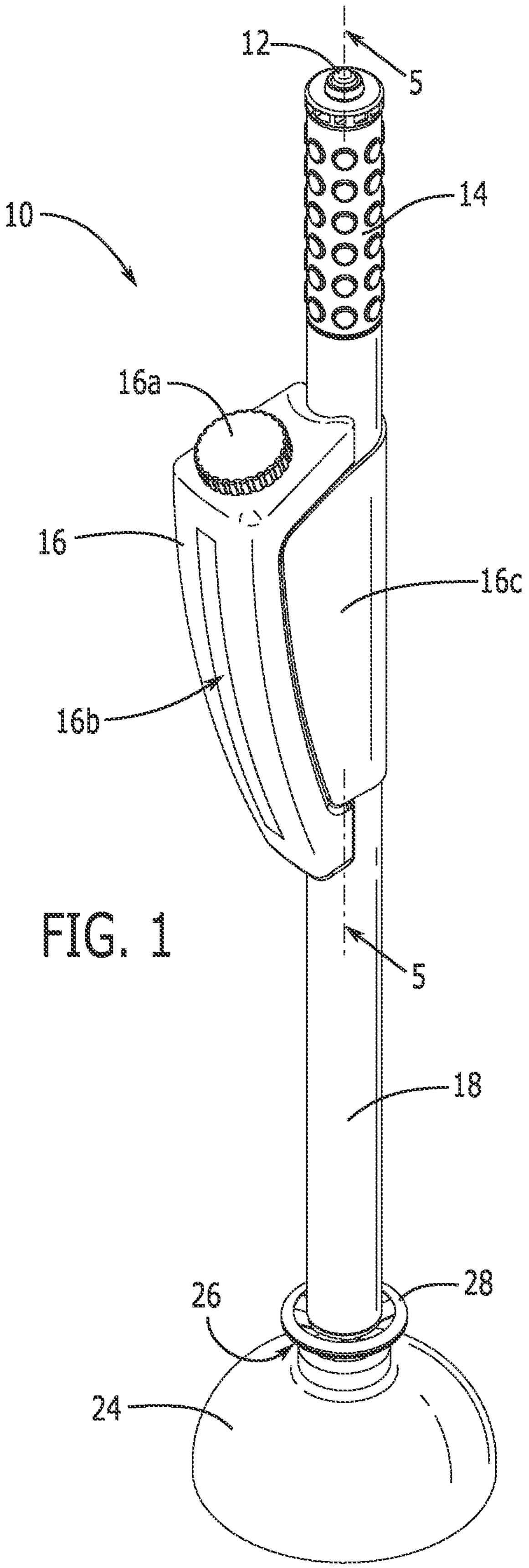
FIG. 1 is a perspective view of a plunger according to an embodiment of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a plunger caddy with an integrated plunger cleaning apparatus.

The location of a pump, when present, is not particularly limited, as long as it is effective to move the liquid from the reservoir to the nozzle.

In some embodiments, the pump is a manual reciprocating pump. The exertion of force on the pump may push air through the tubing. The forced air may expel fluid through the spray wand over the outside parts of the plunger cup.

In other embodiments, the pump is electronically actuated and may be battery powered.

The cleaning mechanism may clean the exterior of the plunger cup using fluid held in a fluid reservoir. The plunger may be cleaned immediately after use, in one step, so that it may be stored in a clean or disinfected state, such as next to the toilet, therefore eliminating the spread of germs outside the toilet.

The present invention also provides a method to clean a toilet plunger with a mechanism present within the plunger receptacle.

In some embodiments, a plunger caddy according to another embodiment comprises a housing which may be monolithic or may be modular, such as comprising an upper housing shell coupled to a lower housing shell. The housing may further comprise a neck element, forming a channel. The housing may, for example, be molded by injection molding. The caddy may have an integrated cleaning apparatus comprising a spray wand with a handle having an actuator. The housing may have a base operative to conduct air into the plunger cup. The housing may have multiple compartments formed therein. A first compartment, operative to accommodate the plunger, may have a sidewall defining a spray wand receptacle. The housing may have a plunger retention clasp, a wand support, and a tubing guide or retainer, which may comprise an upper hook and a lower hook in some cases.

The materials of manufacture are not particularly limited. The plunger cup may be formed from any suitable material, including but not limited to rubber. The handle may be made from polyvinyl chloride (PVC) tubing or wood, for example. The spray wand handle grip may be rubber or plastic. The plunger receptacle and fluid reservoir may be injection molded plastic. Tubing may be made in any suitable manner known in the art.

Referring to FIGS. 1 through 7, FIG. 1 shows a plunger 10 according to an embodiment of the present invention comprising an elongate tubular handle 18 with a handle grip 14 and a pump actuator button or spray button 12 at an upper end, a plunger cup 24 at a lower end, and a reservoir 16 attached therebetween. The reservoir 16 may include a reservoir cap 16*a* and a reservoir volume or level indicator window 16*b* and may be clamped to the handle 18 with a reservoir wrap 16*c*. The plunger cup 24 has a concave inner (or lower) surface and a convex outer (or upper) surface.

Figure 2:
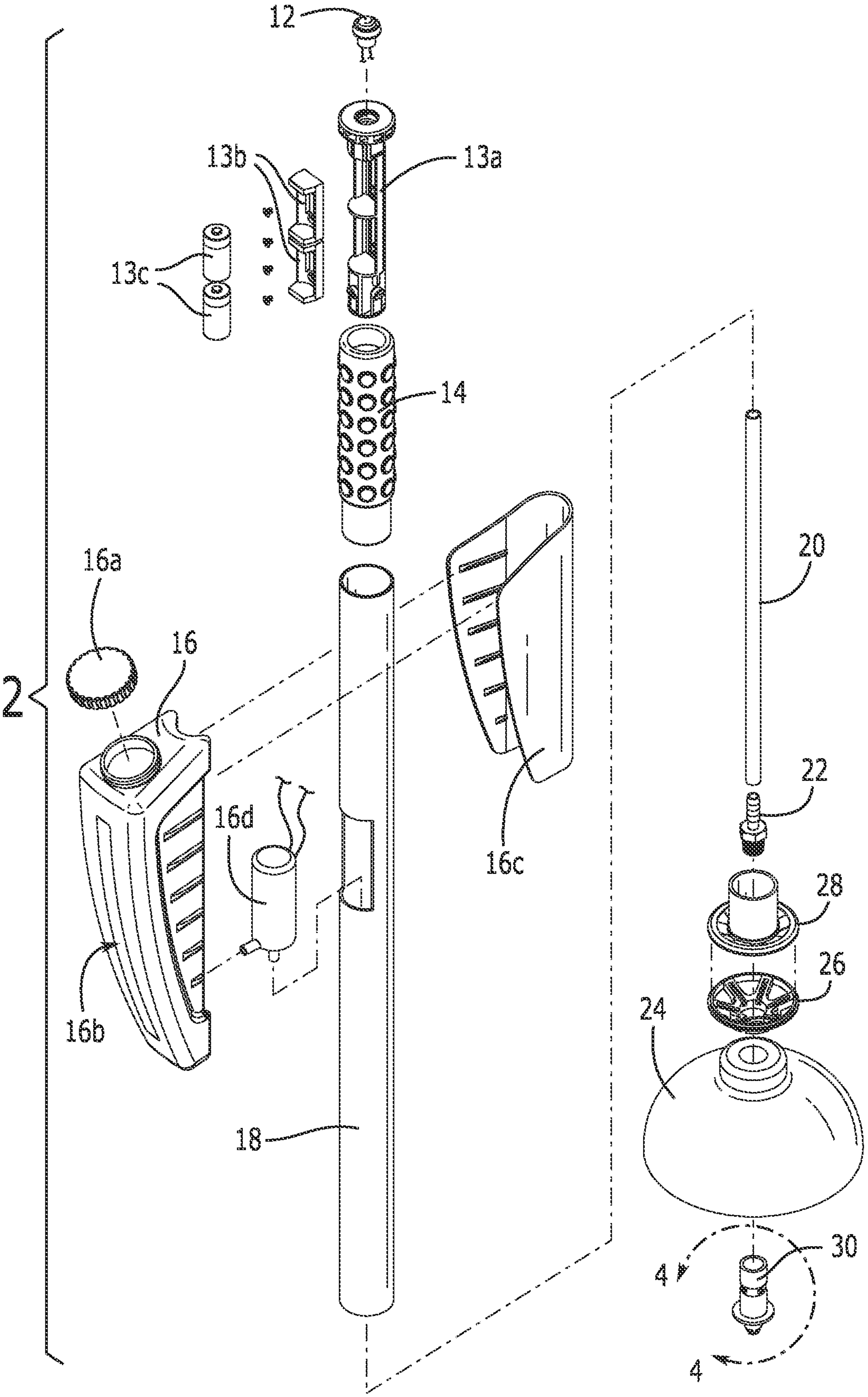
FIG. 2 is an exploded perspective view thereof.

Housed within the handle 18, the spray button 12 extends from a battery retainer 13*a*, a reservoir pump 16*d*, and a fluid conduit comprising a flexible tube 20 with a hose barb fitting 22, as shown in FIGS. 2 and 5. The conduit is operative to feed a cleaning fluid to a spray assembly or fluid dispersing assembly comprising an upper component or upper sprayer assembly, comprising a central body 28 coupled to the handle 18 and a distributor 26 with spray nozzles, apertures, or orifices 36 distributed around the plunger cup 24, and a lower component, lower sprayer assembly, or bottom sprayer 30. The reservoir 16 is in fluid communication with the bottom sprayer 30 by way of the conduit, i.e., the tube 20 and barb fitting 22.

As shown in FIG. 3, the battery retainer 13*a* is removably inserted into the top of the handle 18. The battery retainer 13*a* includes a battery holder 13*b* to hold batteries 13*c*.

As shown in FIG. 4, the bottom sprayer 30 may have ports 32 fluidly communicating with the distributor 26, as well as orifices 34.

Figure 6:
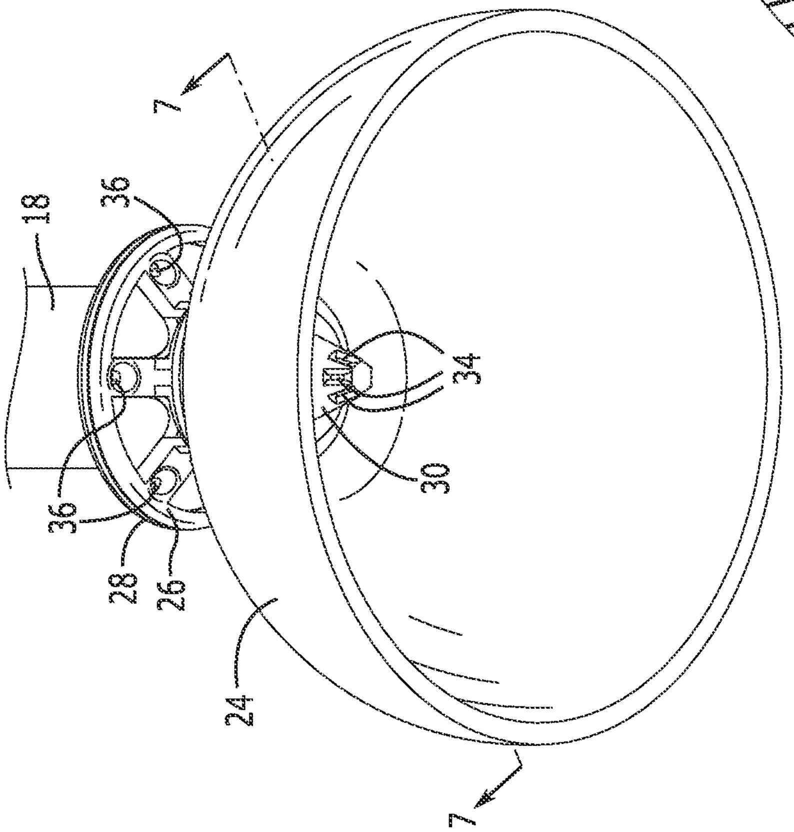
FIG. 6 is a detail perspective view of a plunger cup unit thereof.

As shown in FIG. 6, the plunger 10 includes orifices 34, 36 both interior to and exterior to the plunger cup 24.

Figure 7:
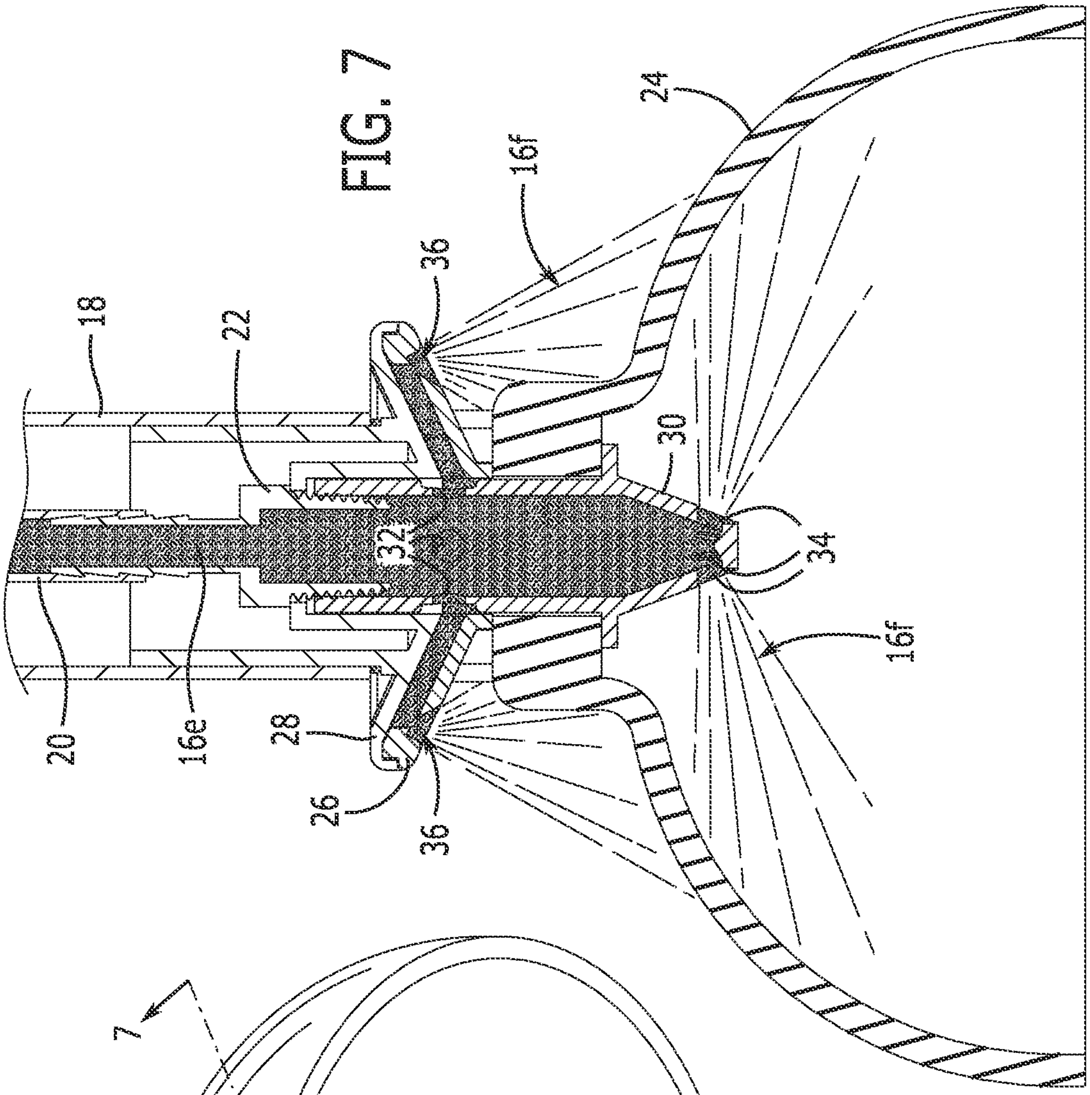
FIG. 7 is a cross-sectional view thereof, taken at line 7-7 of FIG. 6.

FIG. 7 illustrates operation of the plunger 10. When a user depresses the spray button 12, cleaning fluid or cleaning solution 16*e* is released from the reservoir 16 and urged through the flexible tube 20 and hose barb fitting 22 to the bottom sprayer 30 by the reservoir pump 16*d*. The spray button 12 may, for example, close a circuit allowing electricity to flow and activating the reservoir pump 16*d*. The bottom sprayer 30 extends through a central aperture in the plunger cup 24 directs spray of a first portion of the cleaning solution 16*e* through the ports 32 to the top sprayer orifices 36 to coat the exterior of the plunger cup 24 and directs spray of a second portion of the cleaning solution 16*e* through the bottom sprayer orifices 34 so that discharged cleaning solution 16*f* coats the interior of the plunger cup 24. In other words, the spray assembly is operative to spray both inner and outer surfaces of the cup simultaneously. As the plunger does not require external components to clean the plunger cup, it is referred to herein as a self-cleaning plunger.

Figure 8:
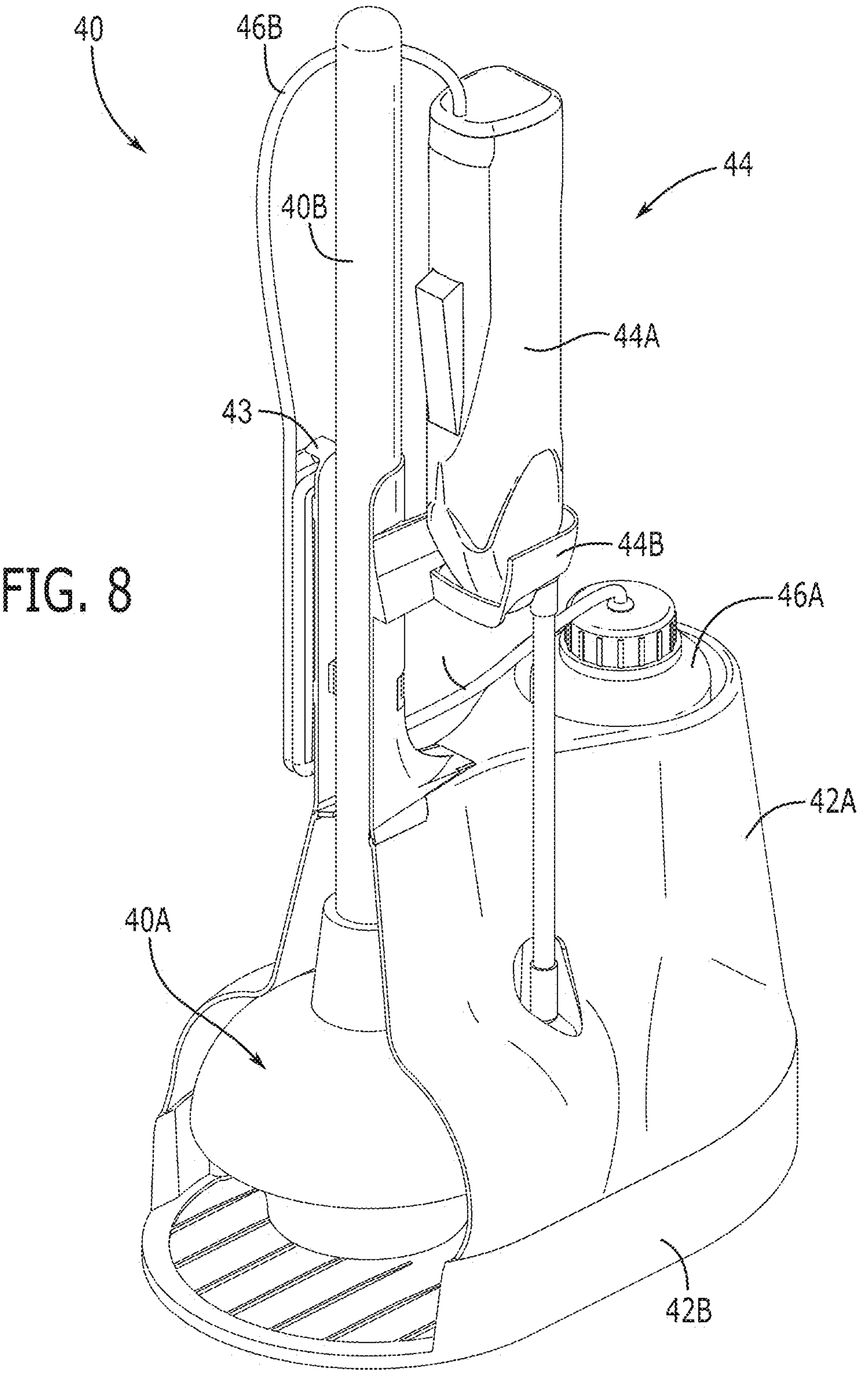
FIG. 8 is a perspective view of a plunger caddy comprising a cleaning apparatus according to another embodiment of the present invention.
Figure 9:
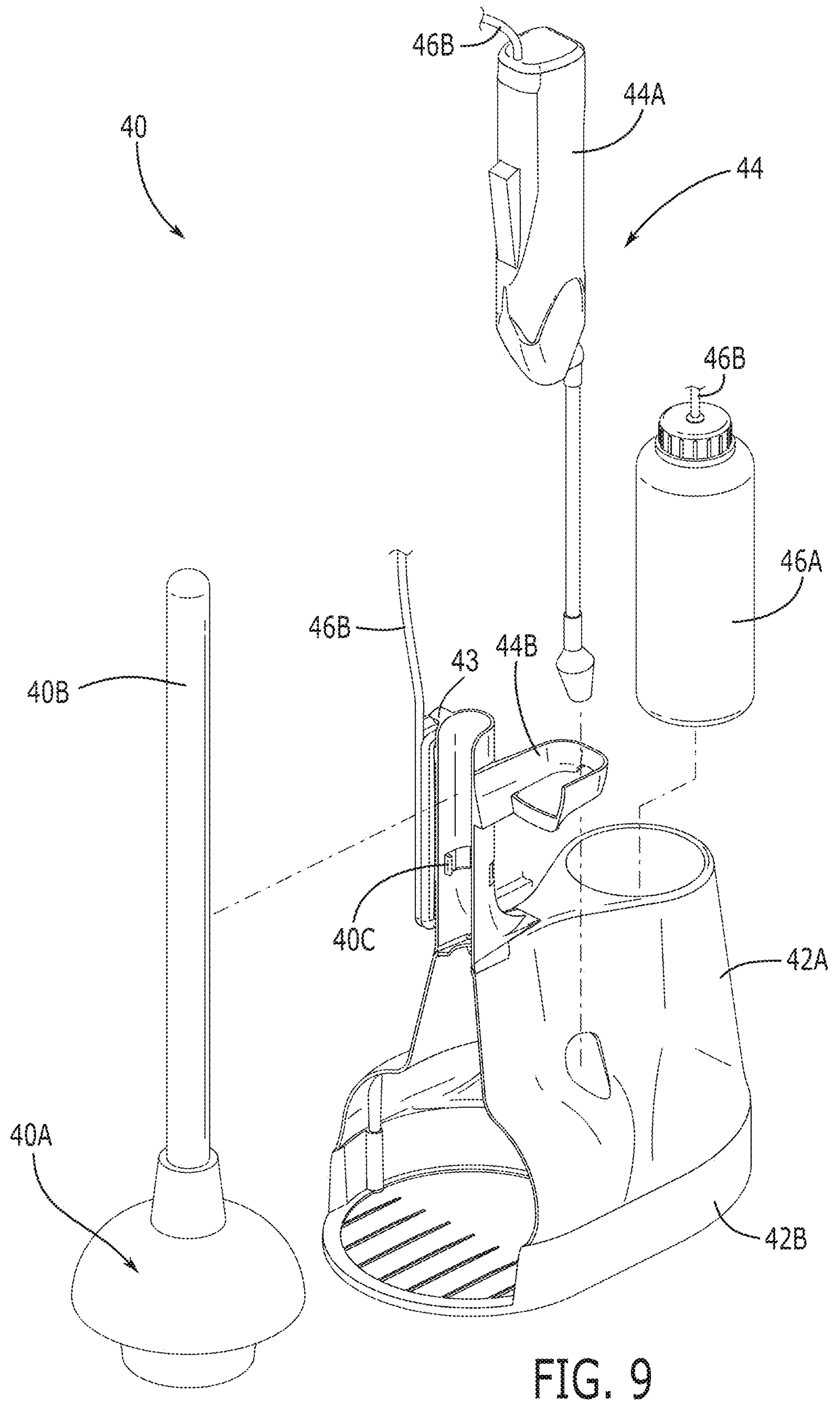
FIG. 9 is an exploded perspective view thereof.

Referring now to FIGS. 8 through 11, a plunger caddy according to another embodiment is shown in FIG. 8 with an exemplary plunger 40. The plunger 40 comprises a plunger cup 40A and a handle 40B and is otherwise not particularly limited. The caddy comprises an upper housing 42A and a lower housing 42B. The caddy further comprises an integrated cleaning apparatus comprising a spray wand 44 with a handle 44A, having an actuator lever or button operative to actuate the spray wand 44. As shown in FIG. 9, the lower housing 42B includes a circular base having parallel ridges or grooves operative to enable air to enter an interior of the cup 40A. The upper housing 42A has two adjacent rounded compartments formed therein and is coupled to the lower housing 42B.

Figure 10:
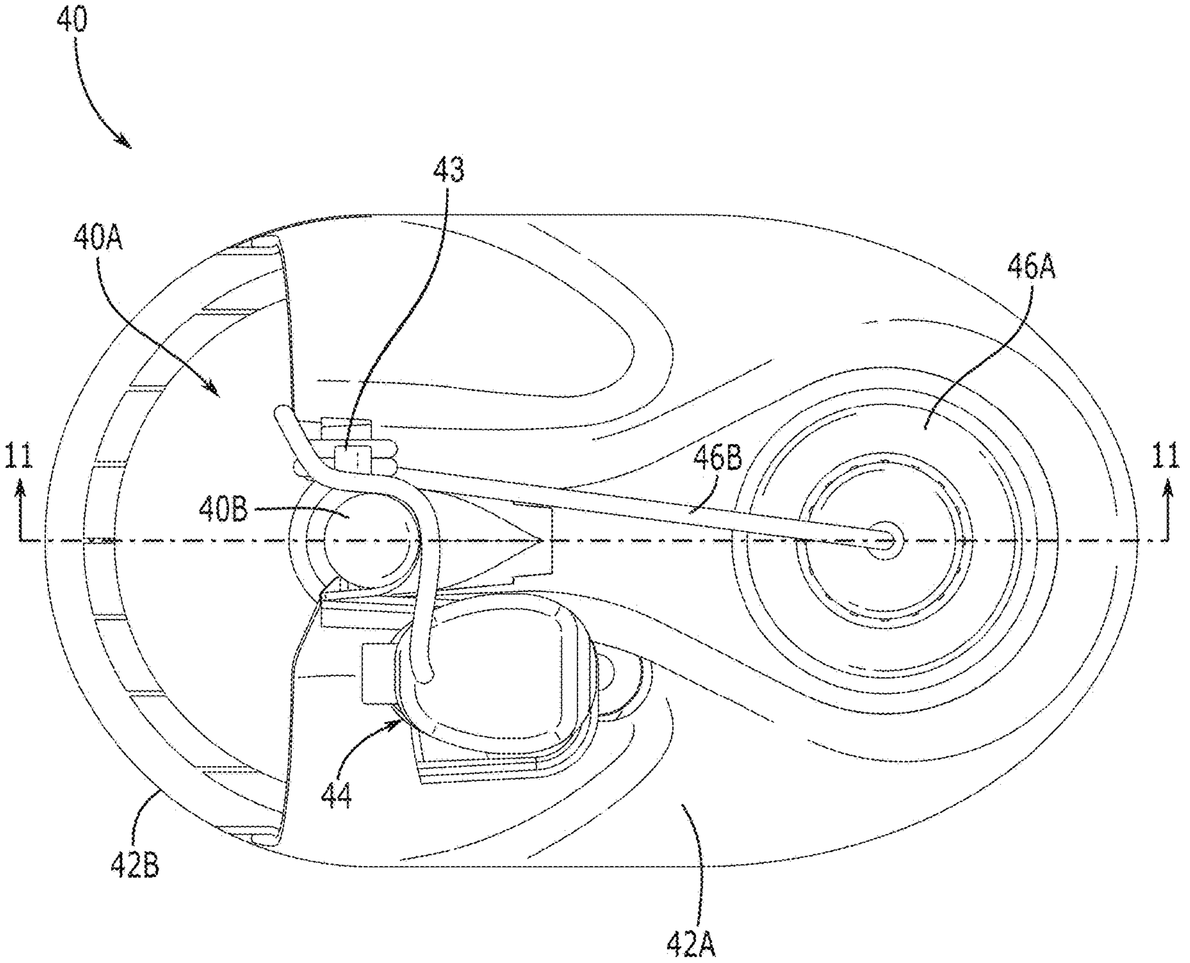
FIG. 10 is a top plan view thereof.

As illustrated in FIG. 9, a first compartment, aligned with the circular base, has curvilinear sidewalls operative to accommodate the plunger 40, each wall curving around the plunger cup 40A. One sidewall further defines a spray wand holster, adjacent to the plunger cup 40A, operative to accommodate the spray wand 44 in a stored position. The sidewalls taper to join at a top region, having an elongated vertical channel, having an outer surface and an inner surface with a plunger retention clasp 40C operative to securely accommodate the plunger handle 40B in a stored position. The outer surface has a wand support 44B extending therefrom, aligned with the holster. The spray wand 44 receives cleaning fluid from a fluid reservoir 46A via tubing 46B. The tubing 46B fluidly communicates with the fluid reservoir 46A and with the spray wand 44 via the handle 44A. The tubing 46B passes through a cap on the fluid reservoir 46A and is clipped to a tubing guide 43 joined to the exterior surface of the elongated vertical channel, as shown in FIGS. 8, 10, and 11.

Figure 11:
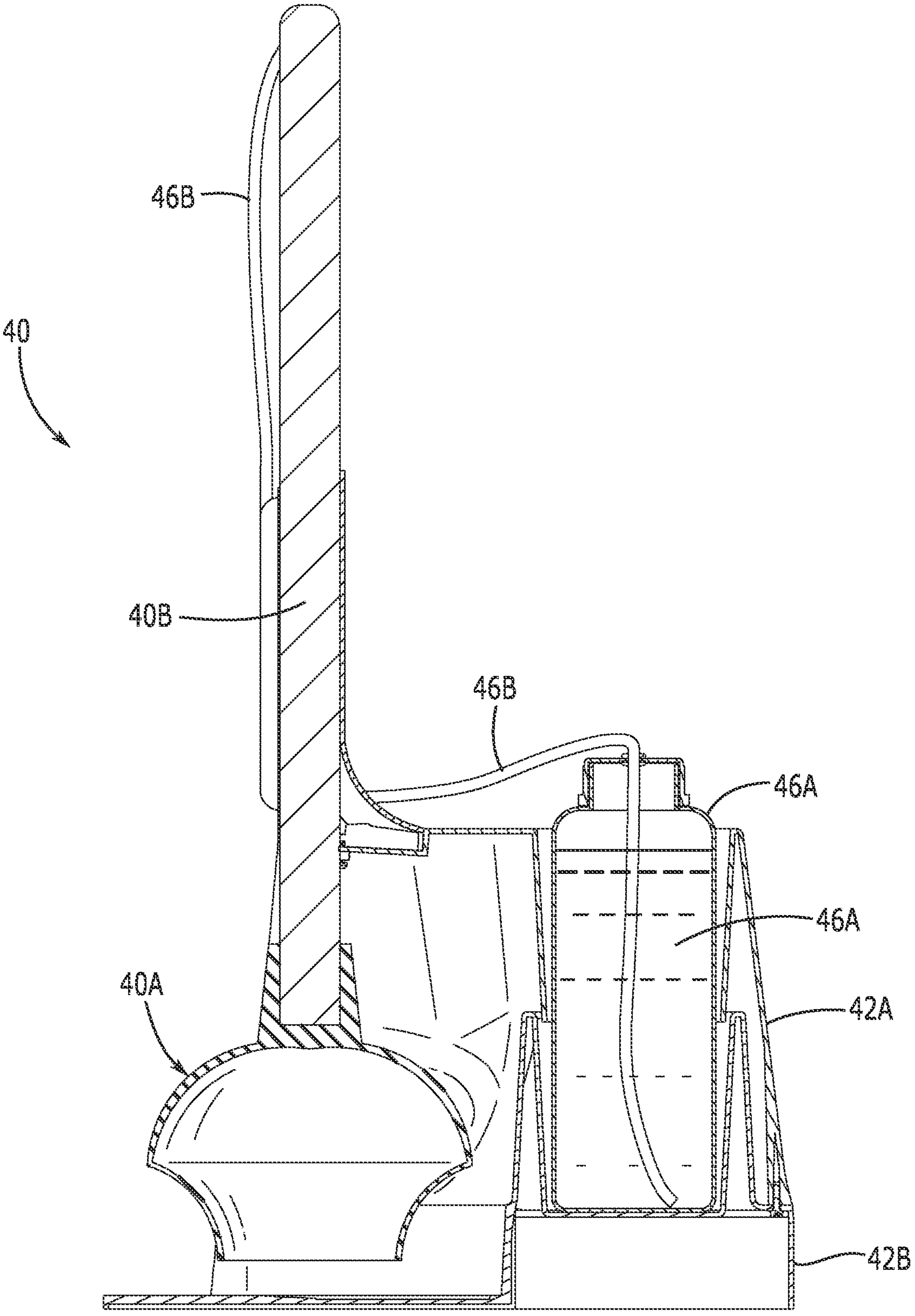
FIG. 11 is a cross-sectional view thereof, taken along line 11-11 on FIG. 10.

A second compartment has an elevated bottom wall relative to the circular base, as most clearly seen in FIG. 11, with a cylindrical sidewall rising therefrom. The second compartment accommodates the fluid reservoir 46A.

It should be understood, of course, that the foregoing relates to exemplary embodiments of the invention and that modifications may be made without departing from the spirit and scope of the invention as set forth in the following claims.

What is claimed is:

1. A plunger caddy and cleaning assembly, comprising:

a) a housing configured to accommodate a plunger;

b) a fluid reservoir mounted within the housing;

c) a tubing extending from an interior of the fluid reservoir; and d) a fluid dispersing assembly in fluid communication with the fluid reservoir by way of the tubing, the fluid dispersing assembly having a spray wand with a handle, wherein the fluid dispersing assembly is removably mounted to the housing and wherein the housing further comprises a vertical neck having an outer surface with a handle rest formed thereon, the handle rest being operative to suspend the handle when the fluid dispersing assembly is in a storage position.

2. The plunger caddy and cleaning assembly of claim 1, wherein the handle further comprises an actuator operative to actuate fluid movement from the fluid reservoir to the spray wand.

3. The plunger caddy and cleaning assembly of claim 1, wherein the fluid reservoir further comprises a reservoir cap having formed therein an aperture operative to retain the tubing within the fluid reservoir when the reservoir cap is fastened to the fluid reservoir.

4. The plunger caddy and cleaning assembly of claim 1, wherein the housing comprises an upper housing shell coupled to a lower housing shell.

5. The plunger caddy and cleaning assembly of claim 4, wherein the lower housing shell comprises a reservoir compartment having a floor and a sidewall.

6. The plunger caddy and cleaning assembly of claim 4, wherein the lower housing shell comprises a circular base configured to support the plunger.

7. The plunger caddy and cleaning assembly of claim 6, wherein the circular base has raised parallel ridges extending across at least a portion thereof.

8. The plunger caddy and cleaning assembly of claim 4, wherein the upper housing shell forms a first compartment, configured to accommodate the plunger, and a second compartment, configured to accommodate the fluid reservoir.

9. The plunger caddy and cleaning assembly of claim 8, wherein the upper housing shell further forms a spray wand receptacle, configured to accommodate the spray wand.

10. The plunger caddy and cleaning assembly of claim 9, wherein the spray wand receptacle is an aperture formed in a sidewall of the upper housing shell.

11. The plunger caddy and cleaning assembly of claim 4, wherein the vertical neck forms a channel having a clamp operative to accommodate a plunger handle with an interference fit.

12. The plunger caddy and cleaning assembly of claim 11, wherein the outer surface has a tubing guide formed thereon, operative to secure the tubing.

* * * * *